(12) United States Patent
da Cunha et al.

(10) Patent No.: US 7,348,970 B2
(45) Date of Patent: Mar. 25, 2008

(54) DISPLAY SYSTEM AND METHOD OF USING SAME

(75) Inventors: John M da Cunha, Corvallis, OR (US); Andrew Koll, Albany, OR (US); Eric T. Martin, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 897 days.

(21) Appl. No.: 10/264,131

(22) Filed: Oct. 2, 2002

(65) Prior Publication Data

US 2004/0066380 A1    Apr. 8, 2004

(51) Int. Cl.
*G09G 3/22* (2006.01)

(52) U.S. Cl. ............ 345/183; 345/182; 345/179; 178/19.05

(58) Field of Classification Search ............ 345/81–84, 345/204, 207, 690–692, 173–183; 178/18.09, 178/19.05; 315/169.3, 169.1
See application file for complete search history.

(56) References Cited

U.S. PATENT DOCUMENTS

| | | | | |
|---|---|---|---|---|
| 5,638,093 A | * | 6/1997 | Takahashi et al. | 345/173 |
| 5,687,259 A | * | 11/1997 | Linford | 382/294 |
| 5,838,308 A | * | 11/1998 | Knapp et al. | 345/173 |
| 6,166,496 A | * | 12/2000 | Lys et al. | 315/316 |
| 6,225,976 B1 | * | 5/2001 | Yates et al. | 345/156 |
| 6,313,816 B1 | * | 11/2001 | Kojima et al. | 345/83 |
| 6,320,325 B1 | * | 11/2001 | Cok et al. | 315/169.3 |
| 6,424,326 B2 | * | 7/2002 | Yamazaki et al. | 345/77 |
| 6,680,579 B2 | * | 1/2004 | Allen et al. | 315/169.3 |

FOREIGN PATENT DOCUMENTS

| | | | |
|---|---|---|---|
| FR | 2652185 | * | 3/1991 |
| GB | 2118803 | * | 11/1983 |
| JP | 01-196100 | * | 8/1989 |
| JP | 05-204330 | * | 8/1993 |

* cited by examiner

*Primary Examiner*—Lun-Yi Lao

(57) ABSTRACT

An optically addressable display includes a plurality of receptor and emitter pairs where each pair is for receiving optical display information and for generating light indicative of the display information. Each individual receptor and emitter pair is coupled electrically by an associated control circuit that facilitates driving the emitter so it generates either the received display information or annotation information generated by a light wand that is capable of being optically coupled to individual ones of the plurality of receptors. Each control circuit has a pulse density capture circuit that receives a pulse train signal indicative of a desired brightness or hue levels and drives an individual one of the emitters on and off at a determined duty cycle to produce the desired brightness or hue levels. In another embodiment sets of receptor and emitter pairs are grouped in cells, where each cell is capable of generating N of shades of different colors.

14 Claims, 3 Drawing Sheets

DISPLAY SYSTEM AND METHOD OF USING SAME

RELATED APPLICATIONS

This application is related to copending U.S. patent application Ser. No.: 10/143,257, entitled "Writeboard Method and Apparatus", filed on May 9, 2002, and to copending U.S. patent application Ser. No.: 10/263.996, entitled "Freezable Projection Display", filed concurrently herewith, which application are incorporated herein as though fully set forth.

BACKGROUND

A simple annotatable display allows for individual display cells to be either activated or deactivated in a static fashion. In this regard, in a monochrome application display, information is either black or white with no shades of gray, or in a color application display, information is either limited to a single pixel color or a binary combination of single pixel colors. Therefore it would be highly desirable to have a new and improved display wherein gray scale and/or improved color gradient depth of millions of color shades can be realized.

SUMMARY OF THE INVENTION

In one embodiment of the present invention an optically addressable display includes a plurality of receptor and emitter pairs where each pair is for receiving optical display information and for generating light indicative of the optical display information. Each receptor and emitter pair is coupled electrically via a control circuit that facilitates driving the emitter so it generates the received display information or received annotation information generated by an external light wand capable of being optically coupled to any of the receptors. Each control circuit has a pulse density capture circuit that receives a pulse train signal indicative of a desired brightness or hue and drives an individual emitter on and off at a determined duty cycle to produce the desired brightness or hue. In another embodiment of the present invention, sets of receptor and emitter pairs are grouped in cells, where each cell includes three receptor and emitter pairs and is capable of generating N shades of different colors where N is determined by the duty cycle and the data transfer rate.

BRIEF DESCRIPTION OF THE DRAWINGS

The above-mentioned features of this invention and the manner of attaining them will become apparent, and the invention itself will be best understood by reference to the following description of the embodiment of the invention in conjunction with the accompanying drawings wherein.

DETAILED DESCRIPTION OF THE PREFERRED EMBODIMENT

Figure 1:
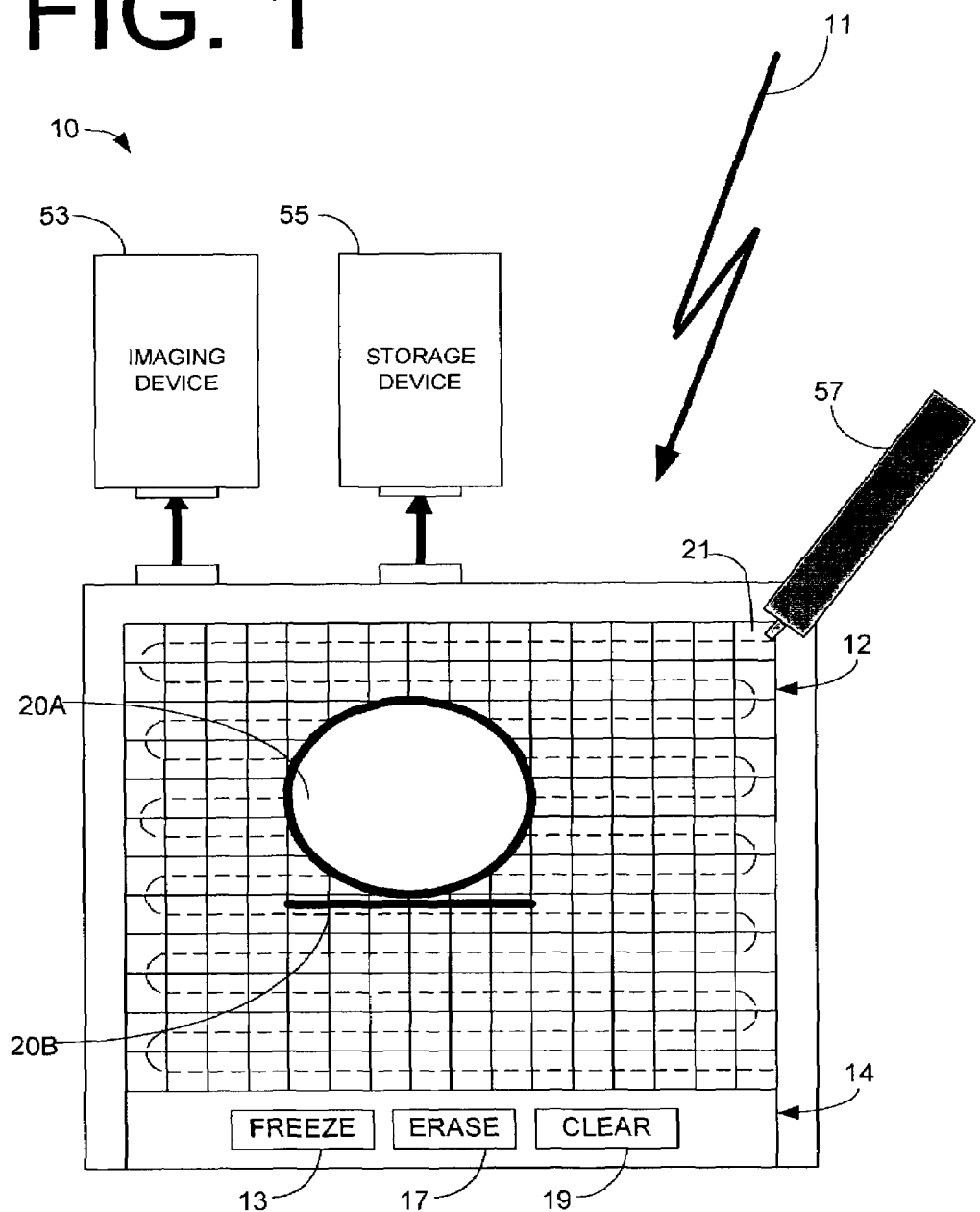
FIG. 1 is a block diagram of an optically addressable display, which is constructed in accordance with the present invention.

Referring now to the drawings and more particularly to FIG. 1 thereof, there is illustrated an optically addressable display 10, which is constructed in accordance with one embodiment of the present invention. The display 10 is adapted to be coupled optically to a light or image source, such as an infrared light source 11 by an optical communication link (not shown). The infrared light source 11 generates light with specific wavelengths that are indicative of digital information that is emitted from the display 10 in the form of visible light in one or more of the primary colors of red, green and blue. In the preferred embodiment of the present invention, the image or light source 11 is an optical projector that is configured to transmit an image to the display 10 via an optical projection signal sent over the optical communication link. In this regard, the optical communication link may be a nonvisible optical communication link and the optical signal may be encoded image data, or the optical communication link may be a visible light link in which the optical signal is visible light directly projected onto the display 10. Where nonvisible light is used, the optical communication link is typically in the infrared spectrum, although other suitable frequency or wavelength spectrums may be utilized. Because the image or display information is transmitted via an optical communication link, it is described herein to be "projected" to the display 10. Thus, as used herein, the terms "projected image" and "projection image" and "display information" are used to refer to an image that is sent from the image source 11 to the display 10 via the optical communication link, whether the image is transmitted using an optical projection signal encoded in nonvisible light such as infrared light, or the optical projection signal is directly projected as encoded visible light.

As best seen in FIG. 1, the display 10 is further adapted to be connected to various output and input devices, such as an imaging device 53, a storage device 55, and a annotation implement or light wand 57 to provide full display system capabilities. As will be explained hereinafter in greater detail, the display 10, in one mode of operation functions as write board with full color scaling capability for user entered annotation information or data that is controlled by the light wand 57. In another mode of operation display information optically coupled to the display 10 from the light source 11 is dynamically displayed in millions of different color shades. In still yet another mode of operation the dynamic display information is frozen in a continuous static display state until selectively overwritten by user entered annotation information having a user selected color shade of between about one shade of color and about a million shades of color.

Figure 2:
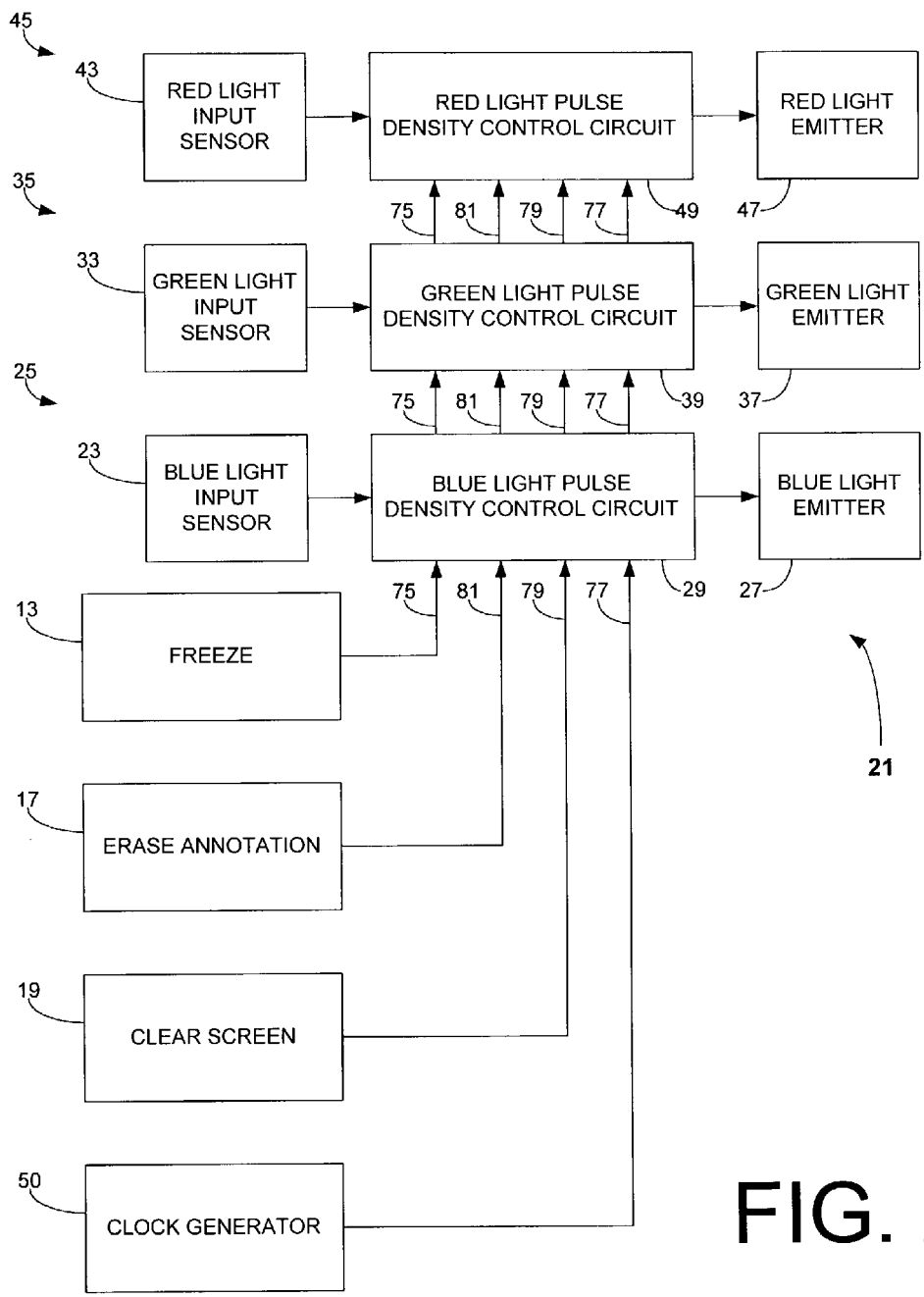
FIG. 2 is a block diagram of an operative cell forming part of the optically addressable display of FIG. 1.
Figure 3:
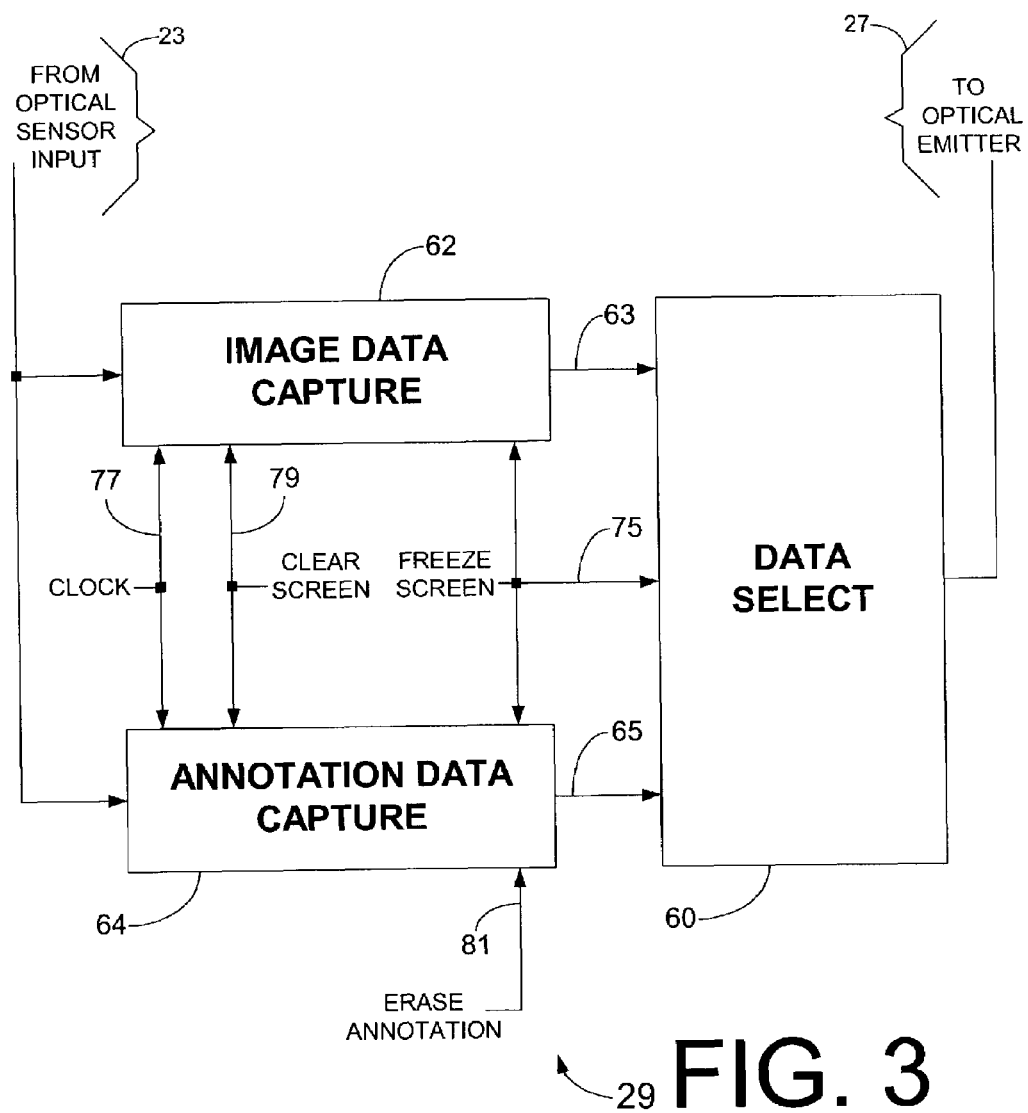
FIG. 3 is a block diagram of a pulse density control circuit of FIG. 2.

Considering now the optically addressable display 10 in greater detail with reference to FIGS. 1-3, the display 10 generally includes a display screen 12 and an operator control panel 14 that cooperate to facilitate various display operations as more fully described in Table A. For the moment, when reviewing Table A, it is important to note that the operator control panel 14 includes three switches, a freeze switch 13, an erase annotation switch 17 and a clear screen switch 19.

The freeze switch 13 when activated, causes a freeze control signal 75 to be generated, which in turn causes the image that is currently being displayed dynamically in response to the light source 11 to be captured and displayed as a continuous static image, such as a static display image 20A as seen in FIG. 1. The freeze switch 13, in cooperation with the annotation wand 57, enables a user to selectively overwrite the static image 20A with annotation information, or enter annotation information independent of the static display image. For example, the user can utilize the annotation wand 57 to underline the static image 20A with an underline image 20B that does not coincide with the static image 20A. However, if the user had created an annotation that occupied the same pixel space as the static image 20A, the annotation image would be displayed wherever pixels coexisted between the annotation information and the static display information. This mode of operation will be described hereinafter in greater detail.

The erase annotation switch 17 causes an erase control signal 81 to be generated that causes the annotation pixels to be cleared where no static information was previously displayed and causes the annotation pixels to be replaced with captured image data when such captured image data was replaced by annotation data. This is an important feature of the present invention since the display 10 is able to retain a memory of previously captured image information and again display such information whenever the erase annotation switch 17 is activated to erase all of the annotation information.

various shades, and where receptor and emitter pair 45 is for receiving and generating red light of various shades.

While in the preferred embodiment of the present invention, the receptors have been described as receiving different components of primary light (red, green and blue) it will be understood by those skilled in the art that other components of light may also be received, such as cyan, magenta, and yellow. There is therefore no intend of limiting the present invention to receiving any specific component of light, as all different shades, hues, brightness of any color of light is contemplated within the true scope and spirit of the present invention.

As best seen in FIG. 2, each display cell includes at least one control circuit for coupling a receptor and emitter pair electrically together in such a manner to help implement the various display modes of operation as mentioned earlier. Thus, for example, the display cell 21 includes a blue light pulse density control circuit 29, a green light pulse density

TABLE A

| FREEZE MODE | ANNO. INPUT | ERASE CAPTURED ANNOTATION | CLEAR SCREEN | LED DRIVE MODE |
|---|---|---|---|---|
| OFF | NONE | NO = 0 | NO = 0 | DISPLAY DYNAMICALLY PROJECTED DISPLAY INFORMATION OPTICALLY COUPLED TO DISPLAY CELLS |
| ON | NONE | NO = 0 | NO = 0 | DISPLAY STATICALLY CAPTURED PROJECTED DISPLAY INFORMATION OPTICALLY COUPLED TO DISPLAY CELLS |
| ON | ACTIVE | NO = 0 | NO = 0 | OVERWRITE CAPTURED PROJECTION INFORMATION SELECTIVELY WITH ACTIVE ANNOTATION INFORMATION |
| ON | ACTIVE | YES = 1 | NO = 0 | OVERWRITE ACTIVE ANNOTATION INFORMATION WITH PREVIOUSLY CAPTURED PROJECTED INFORMATION OPTICALLY COUPLED TO DISPLAY CELLS |
| ON | NONE | NO = 0 | YES = 1 | CLEAR SCREEN OF PREVIOIUSLY CAPTURED PROJECTED INFORMATION AND ANNOTATION INFORMATION |

The clear screen switch 19 causes captured annotation information and captured projection display information to be erased from the display screen 12 by turning all of the emitters to an off state. In short, the display screen 12 becomes a writeboard since any one of the emitters may be individually activated thereafter. As will be explained hereinafter in greater detail, while the display is still in the FREEZE mode of operation, the user, via the annotation wand 57 is able to write on the whiteboard screen 12.

As best seen in FIGS. 1-2, the display screen 12 is composed of a plurality of display cells, such as a display cell 21, where each display cell includes a plurality of receptor and emitter pairs, such as the receptor and emitter pairs 25, 35, and 45 as best seen in FIG. 2. The receptor and emitter pairs of each cell are arranged in groups of three for receiving and generating light in the three primary colors of red, green and blue. Thus, for example cell 21 includes the three receptor and emitter pairs 25, 35, and 45, where receptor and emitter pair 25 is for receiving blue data and for emitting blue light of various shades, where receptor and emitter pair 35 is for receiving and generating green light of control circuit 39 and a red light pulse density control circuit 49. Each individual pulse density control circuit control a receptor and emitter pair that includes a light input sensor and a light emitter. In this regard, the blue light pulse density circuit 29 couples a blue light input sensor 23 with a blue light emitter 27. In a similar manner, the green light pulse density circuit 39 couples a green light input sensor 33 with a green light emitter 37, while the red light density control circuit 49 couples a red light input sensor 43 with a red light emitter 47.

The individual light input sensors 23, 33, and 43 are individually tuned to receive light data of a given wavelength that is unique to one of the primary colors. For example, the blue data input sensor 23 is tuned to receive and process light within a wavelength spectrum indicative of blue light; the green light input sensor 33, is tuned to receive and process light within another wavelength spectrum indicative of green light; and the red light input sensor 43 is tune to receive and process light within yet another wavelength spectrum indicative of red light. In this manner, the display cell 21 is capable of displaying a wide range of different color shades ranging from a single shade of a single color to millions of color shades in one or more different colors determined by the duty cycle and the data transfer rate of the processed information.

As each of the pulse density control circuits 29, 39, and 49 within the display cell 21 are substantially the same except for their tuned sensing capability to process light of a particular wavelength of IR light, only the blue light pulse density circuit 29 will be described herein after in greater detail.

Considering now the blue light pulse density control circuit 29 in greater detail with reference to FIG. 3, the blue light pulse density control circuit 29 includes a data select circuit 60 whose output is coupled to the blue light emitter 27. The data select circuit 60 is a conventional LED driver that permits the blue light emitter 27 to be driven on and off at a determined duty cycle so that its emitted light is perceived in any one of at least N different shades of the primary color blue. In this case, N is determined by the duty cycle and the data rate. The data select circuit 60 drives the emitter 27 according to the following states:

1. In a free running state or NORMAL MODE of operation, the emitter 27 is driven so that its light output corresponds to the light received by its associated blue light input sensor 23 from the light source 11. This free running state is a dynamic state that is constantly changing depending upon the light received from the light source 11.

2. In a capture image state, the emitter 27 is driven so that its light output corresponds to a currently displayed shade of blue at the moment in time when the freeze control signal 75 is received from the freeze switch 13 forming part of the control panel 14. In this mode of operation, known as the FREEZE MODE, whenever a user desires to capture a displayed image, the user actuates the freeze switch 13, which in turn facilitates the generation of the freeze control signal 75.

3. In an annotate image state, the emitter 27 is driven so that its light output corresponds to the blue data received from the light wand 57. In this mode of operation, known as the ANNOTATE MODE, the annotation information received from the light wand 57 causes an overwrite condition that eliminates any previously captured information and replaces this information with the blue data received from the light wand 57.

4. In a clear image state, the emitter 27 is turn off so that no light is emitted.

As best seen in FIG. 3, the control circuit 29 includes a pair of logic implementing digital circuits indicated as an image data capture digital circuit 62 and an annotation data capture digital circuit 64. The circuits 62 and 64 will be described hereinafter in greater detail. It can be seen however, that the output signals of each of the respective circuits 62 and 64, are coupled to the input of the data select circuit 60 for effectively supplying the data select circuit 60 with either a display information duty cycle signal on a first input signal line 63 or an annotation information duty cycle signal on a second input signal line 65. It can also be seen that the input signals to respective ones of the logic implementing digital circuits 62 and 64 is the same, and is derived from the optical sensor 23.

Considering now the operation of the pulse density control circuit 29 in still greater detail, when the display 10 is initially powered up, it proceeds to a NORMAL MODE, where light information from the light source 11 is automatically displayed on the display screen 12. In this regard, the freeze signal 75, the clear screen signal 79 and the erase annotation signal 81 are each deasserted, thereby permitting the control circuits 29, 39, and 49, to pass any light sensor signals generated by the receptors 23, 33, and 43 for example, to their respective emitters 27, 37 and 47.

In this NORMAL MODE of operation, the optical input sensors 23, 33, and 43 respond to light received from the light source 11 and convert any light (that is within the wavelength spectrum of the tuned sensor) that impinges upon cell 21 to an electrical signal. The electrical signal includes both header information and light shading information in the form of a series of encoded pulses. Since the steps followed by each of the pulse density control circuits 29, 39, and 49 are substantially the same, only the operation of the pulse density control circuit 29 will be described hereinafter in greater detail.

As best seen in FIG. 3, the series of encoded pulses received from the blue light sensor 23 are directed to both the image data capture circuit 62 and the annotation data capture digital circuit 64. The digital circuits 62 and 64 determine from the header information whether the input signal has been generated in response to the light source 11 or from the light wand 57 which are mutually exclusive from one another. If the input signal has been generated in response to the light source 11, the output signal 65 of the annotation data capture circuit 64 is deasserted, while the output signal 63 of the image data capture circuit 62 goes to a pulse rate that is indicative of the light shading information received from the optical sensor input 23. This pulse rate is sufficient to allow the data select circuit 60 to drive the emitter 27 on and off to produce any one of at least N different shades of a single color, depending upon the shading information received from the light source 11. The light generated by the emitter 27 is dynamic and changes in response to any changes in the display information produced by the light source 11.

Conversely, if the header information indicates that the pulse train was generated by the cell 21 interacting with light received from the light wand 57, the image data capture circuit output signal 63 is deasserted, while the output signal 65 of the annotation data capture circuit 64 goes to a pulse rate that is indicative of the annotation information. This pulse rate is sufficient to allow the data select circuit 60 to drive the emitter 27 on and off to produce any one of at least N different shades of a single color, depending upon the shading information received from the light wand 57. The annotation information generated by the light wand 57 also overwrites any display information that was previously displayed by the emitter 27. However, it should be noted that the image data capture circuit 62 retains the display information and will again supply the information to the data select circuit 60, whenever the erase annotation signal 81 is asserted. More particularly, when the erase annotation signal 81 is asserted, the signal is coupled to the annotation data capture circuit 64 to cause its output signal to be deasserted, thereby allowing the image data capture circuit output signal 63 to drive the data select circuit 60. In this manner, the emitter 27 will once again generate light that is indicative of the display information received from the light source 11.

It should be noted that the pulse rate of the output signals 63 and 65 is a function of a clock signal 77 that is generated by a clock generator 50 that is part of the display 10. In this regard, the clock signal 77 generated by the clock generator 50 is coupled to both the image data capture logic implementing digital circuit 62 and the annotation data capture logic implementing digital circuit 64.

Considering now the operation of the display 10 in greater detail when a user actuates the clear screen switch 19, the actuation of the clear screen switch 19 causes the clear screen signal 79 to be asserted. In this regard, when the clear screen signal 79 is asserted it causes the image data capture circuit output signal 63 to be deasserted and the annotation data capture circuit out signal 65 to be temporarily deasserted as well, thereby causing the emitter 27 to be driven to an off state. In this regard, the light output from the emitter 27 is combined with the output of emitters 37 and 47 to cause the display 10 to become a writeboard. This writeboard state will remain static until such time as the user utilizes the light wand 57 to write on the writeboard screen 12. In that event, the annotation information received by the input sensors, such as the input sensors or receptors 23, 33, and 43 for example, will cause their respective annotation data capture circuits, such as the digital circuit 64, to once again generate an output signal that is indicative of the shading information provided by the light wand 57. For a detailed discussion of the operation of the light wand 57, reference should be made to U.S. patent application Ser. No. 10/143,257, filed on May 9, 2002, entitled "Writeboard Method and Apparatus, which application is incorporated in its entirety herein as though fully set forth.

Considering now the operation of the display 10 in greater detail, when a user actuates the freeze switch 13 the actuation causes the freeze signal 75 to be asserted. In this regard, when the freeze signal 75 goes to a logic high state it causes the current dynamic display information to be captured or frozen in a continuous static condition. That is the output of the image data capture circuit 62 is a pulse train that refreshes the emitter 27 at a continuous duty cycle to produce the displayed shade of color that was being displayed by emitter 27 when the freeze signal 75 was received. This condition prevents any new display information from the light source 11 from changing the image displayed on the screen 12. However, the user may interact and provide annotation information that will supercede the display information on a pixel-by-pixel basis wherever the user, utilizing the light wand 57, causes a cell to be changed. More particularly, when an image is frozen, the image data capture digital circuit 62 continues to supply an output signal on its output 63. Essential then, in the freeze mode, the data select circuit 60 always selects the image data signal unless the annotation data is non-zero, in which case, the annotation data is selected. This allows for annotation to always appear "on top of" the image data. Thus, when in the FREEZE mode, every cell will display the last captured image, except for those cells that have been replaced with annotation information.

While the present invention has been particularly shown and described with reference to the foregoing preferred embodiments, those skilled in the art will understand that many variations may be made therein without departing from the spirit and scope of the invention as defined in the following claims. For example, in the preferred embodiment of the present a full color display was described. However, those skilled in the art will appreciate that a cell could include only a single receptor and emitter pair coupled by a single pulse density control circuit to provide a black and white display with full gray scale capability with N shades of gray. Also although the preferred embodiment of the present invention is directed to an emissive display, there is no intention of limiting the invention to an emissive display as other displays are contemplated within the true scope and spirit of this disclosure. Therefore, the foregoing embodiments are illustrative, and no single feature or element is essential to all possible combinations that may be claimed in this or a later application. Moreover, the description of the invention should be understood to include all novel and non-obvious combinations of elements described herein, and claims may be presented in this or a later application to any novel and non-obvious combination of these elements. Where the claims recite "a" or "another" element or the equivalent thereof, such claims should be understood to include incorporation of one or more such elements, neither requiring nor excluding two or more such elements.

We claim:

1. A display, comprising: a display panel having a plurality of receptor and emitter pairs, each pair for receiving and transmitting light;
   a plurality of control circuits, each individual one of the control circuits for coupling a receptor and emitter pair together for dynamic and static light generating purposes; and
   a plurality of pulse density capture digital circuits, each individual one of the pulse density capture digital circuits for receiving a pulse train signal indicative of a desired brightness or hue and for responding to an individual associated one of the control circuits to facilitate driving an individual associated one of the emitters on and off at a determined duty cycle to produce said desired brightness or hue.

2. The display according to claim 1, wherein said plurality of receptor and emitter pairs are grouped in cells.

3. The display according to claim 2, wherein each cell includes at least one receptor and emitter pair for facilitating generating light in at least N shades of one primary color.

4. The display according to claim 2, wherein each cell includes at least three receptor and emitter pairs for facilitating generating light in at least N shades of three primary colors.

5. The display according to claim 2, wherein each cell facilitates generating light in the primary color shades of red, green and blue.

6. A display, comprising:
   a plurality of light cell means, wherein each light cell means includes:
   light-emitter means for generating light in response to a driver signal;
   display sensor means for receiving display information;
   pulse density capture digital means for generating said driver signal and for causing said driver signal to operate at a sufficient duty cycle to cause said light-emitter means to produce a plurality of shades of light.

7. The display according to claim 6, further comprising:
   control means for causing said light-emitter means to assume either an off state or on state in response to received display information.

8. The display according to claim 7, wherein said display sensor means is responsive to annotation means for receiving overwriting annotation; and
   wherein received annotation information takes precedence over static display information.

9. A display, comprising:
   display panel means having a plurality of cell means for receiving and generating light, the cell means including digital capture circuits;
   control means responsive to at least one pulse train signal generated by said plurality of cells and the digital capture circuits in response to optically received light indicative of a desired brightness or hue and for driving at least an individual one of said plurality of cell means on and off at a determined duty cycle rate to generate said desired brightness or hue.

10. The display of claim 9, wherein said control means further responds to a clear signal for driving said plurality of cell means to deactivate all emitters.

11. The display of claim 10, wherein said control means further responds to an annotate signal for driving user selected ones of said plurality of cell means on and off at a determined duty cycle to change the light level generated by the selected ones of said plurality of cell means to light of a user selected color.

12. The display of claim 11, wherein said control means further responds to a freeze signal for causing said cell means to disregard any other pulse train signals generated by said cell means and to repeatedly drive cell means on and off at said determined duty cycle to generate said desired brightness or hue.

13. The display of claim 12, wherein said control means is further responsive to an annotate signal indicative of another desired shade of light for causing said cell means to cease repeatedly driving said of cell means on and off at said determined duty cycle and to repeatedly drive said cell means on and off at another determined duty cycle to generate said another desired brightness or hue.

14. The display of claim 13, wherein said control means is further responsive to an erase signal for causing said cell means to cease repeatedly driving said cell means on and off at said another determined duty cycle and to repeatedly drive said cell means on and off at said determined duty cycle to again generate said desired brightness or hue.

* * * * *